(12) United States Patent
Wu et al.

(10) Patent No.: US 8,248,369 B2
(45) Date of Patent: Aug. 21, 2012

(54) WHEEL MOUSE

(75) Inventors: Chun-Che Wu, Taipei (TW); Yi-Shun Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 882 days.

(21) Appl. No.: 12/358,941

(22) Filed: Jan. 23, 2009

(65) Prior Publication Data
US 2010/0141583 A1 Jun. 10, 2010

(30) Foreign Application Priority Data

Dec. 5, 2008 (TW) ................................. 97147382 A

(51) Int. Cl.
*G06F 3/033* (2006.01)

(52) U.S. Cl. ........ 345/164; 345/163; 345/165; 345/166; 345/156

(58) Field of Classification Search .................. 345/156, 345/163–166
See application file for complete search history.

(56) References Cited

U.S. PATENT DOCUMENTS

| | | | | |
|---|---|---|---|---|
| 4,906,843 A | * | 3/1990 | Jones et al. | 250/221 |
| 6,326,948 B1 | * | 12/2001 | Kobachi et al. | 345/157 |
| 6,844,871 B1 | * | 1/2005 | Hinckley et al. | 345/163 |
| 7,193,612 B2 | * | 3/2007 | Lindhout et al. | 345/164 |

* cited by examiner

*Primary Examiner* — Alexander S Beck
*Assistant Examiner* — Jeffrey Steinberg
(74) *Attorney, Agent, or Firm* — Kirton McConkie; Evan R. Witt

(57) ABSTRACT

A wheel mouse includes a mouse case, a base, a circuit board, an encoder, a fixing element, a wheel, a switch element and a spring. The circuit board is disposed on the base. The fixing element includes a ring-shaped part and a hollow post. The encoder is accommodated within the ring-shaped part. The wheel includes a rotating shaft and a receptacle. The ring-shaped part of the fixing element is accommodated in the receptacle. A first end of the rotating shaft is inserted into the encoder perforation. The switch element is mounted on the circuit board and under a second end of the rotating shaft. The spring is inserted into the hollow post for offering an elastic force on the fixing element. Since the encoder is accommodated within the wheel, the overall volume of the wheel mouse is reduced and the loading on the wheel is reduced.

9 Claims, 4 Drawing Sheets

WHEEL MOUSE

FIELD OF THE INVENTION

The present invention relates to a mouse, and more particularly to a wheel mouse having a wheel.

BACKGROUND OF THE INVENTION

Due to the amazing power of computer systems, computer systems are developed to have various functions. Input devices such as mouse devices, keyboards or a trackballs have been widely employed in a computer system for cursor control. Among these input devices, the mouse devices are the most prevailing because they are very easy-to-use. When a mouse is held on the palm of the user's hand, the user may move the mouse to control movement of the cursor shown on the computer screen. In addition, by operating the click buttons of the mouse device, the user may select a desired item on the function menu of the browsing frame or execute a corresponding function.

In the early stage, the mouse has a left click button and a right click button. With increasing development of computers and their peripheral devices, today's mouse has an additional wheel for executing a vertical scrolling function. By rotating the wheel of the mouse forwardly or backwardly, the graphic-based window or the web page shown on the computer screen may be scrolled in the vertical direction so as to facilitate the user to browse web pages or documents.

FIG. 1 is a schematic view illustrating the internal portion of a conventional wheel mouse. As shown in FIG. 1, the conventional wheel mouse principally comprises a base 10, a wheel 11, an encoder 12, a rotating shaft 13, a supporting member 14, a circuit board 15 and a switch element 16. The circuit board 15 is disposed on the base 10. The supporting member 14 pierces through the circuit board 15 and fixed on the base 10. The wheel 11 is sheathed around the rotating shaft 13 and supported by the supporting member 14. A portion of the wheel 11 is protruded from the outer surface of wheel mouse such that the wheel 11 can be rotated by a user's finger. The encoder 12 is mounted on the circuit board 15. The encoder 12 is disposed at a first side of the wheel 11. An end of the rotating shaft 13 is inserted into the encoder 12. Upon rotation of the wheel 11, the encoder 12 generates an electronic signal to the circuit board 15. In response to the electronic signal, the graphic-based window or the web page shown on the computer screen will be scrolled in the vertical direction.

Recently, the wheel mouse is developed to have expanded functions. For example, the wheel mouse may have a wheel button function. When the wheel is pressed down to trigger a specified switch element, the wheel button function is executed. An exemplary wheel button function is an automatic vertical scrolling function for automatically scrolling the graphic-based window or the web page shown on the computer screen. Please refer to FIG. 1 again. The switch element 16 is also mounted on the circuit board 15 and at a second side of the wheel 11. In a case that the wheel 11 is pressed down, the rotating shaft 13 is moved downwardly with the wheel 11. Until the rotating shaft 13 is contacted with the switch element 16 under the rotating shaft 13, the switch element 16 is triggered in order to execute the wheel button function.

The conventional wheel, however, still has some drawbacks. For example, since an end of the rotating shaft 13 is inserted into the encoder 12, the loading on the rotating shaft 13 is increased when the wheel 11 is pressed down. As such, the touch feel of depressing the wheel 11 is usually unnatural. After an extended use period, the rotating shaft 13 is readily damaged and needs to be replaced with a new one.

Moreover, the trend of designing a mouse is toward a slim type mouse. For reducing the thickness of the slim type mouse, the space within the mouse case needs to be as small as possible while maintaining the original functions of the wheel mouse. Since the encoder 12 of the conventional wheel mouse is disposed beside the wheel 12 and occupies certain space within the mouse case, the space utilization of the wheel mouse is unsatisfied.

SUMMARY OF THE INVENTION

It is an object of the present invention to provide a wheel mouse, in which reduced loading is exerted on a rotating shaft.

Another object of the present invention to provide a wheel mouse having a reduced space within the mouse case.

In accordance with an aspect of the present invention, there is provides a wheel mouse. The wheel mouse includes a mouse case, a base, a circuit board, an encoder, a fixing element, a wheel, a switch element and a spring. The circuit board is disposed on the base. The encoder has an encoder perforation. The fixing element includes a ring-shaped part and a hollow post. The encoder is accommodated within the ring-shaped part. The wheel includes a rotating shaft and a receptacle. The ring-shaped part of the fixing element is accommodated in the receptacle. A first end of the rotating shaft is inserted into the encoder perforation. The switch element is mounted on the circuit board and under a second end of the rotating shaft. The spring is disposed on the base and inserted into the hollow post for offering an elastic force on the fixing element.

In an embodiment, the wheel mouse further includes an outer frame disposed on the outer periphery of the wheel.

In an embodiment, the wheel mouse further includes a conductive wire, which is connected to the encoder.

In an embodiment, the ring-shaped part of the fixing element further includes an inner frame for fixing the encoder.

In an embodiment, the ring-shaped part of the fixing element further includes an opening, and the conductive wire is penetrated through the opening to be connected with the encoder.

In an embodiment, the wheel mouse further includes a wheel cover for sheltering the ring-shaped part of the fixing element such that the receptacle of the wheel is unexposed.

In an embodiment, the wheel cover further includes a cover aperture aligned with the opening such that the conductive wire is penetrated through the opening and the cover aperture to be connected to the circuit board.

In an embodiment, the rotating shaft is integrally formed with the wheel.

In an embodiment, the wheel mouse further includes a receiving recess formed on the base for accommodating the hollow post and the spring, wherein the spring is sustained against the hollow post and the receiving recess.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
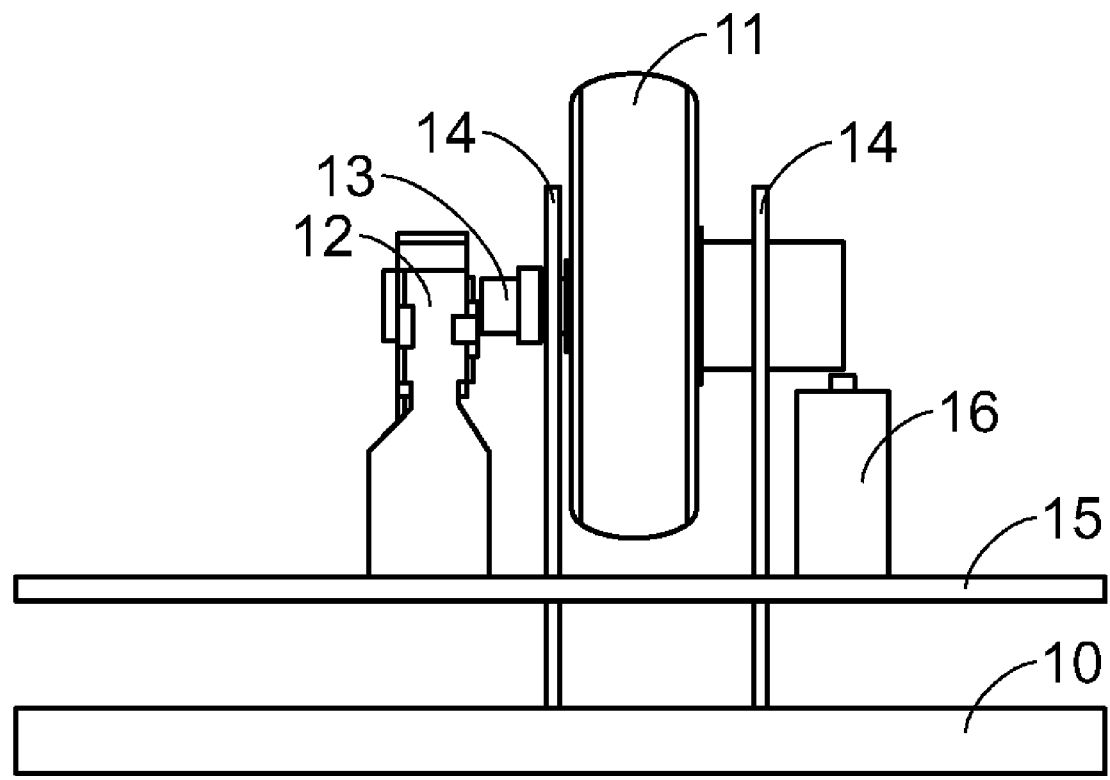
FIG. 1 is a schematic view illustrating the internal portion of a conventional wheel mouse.
Figure 2:
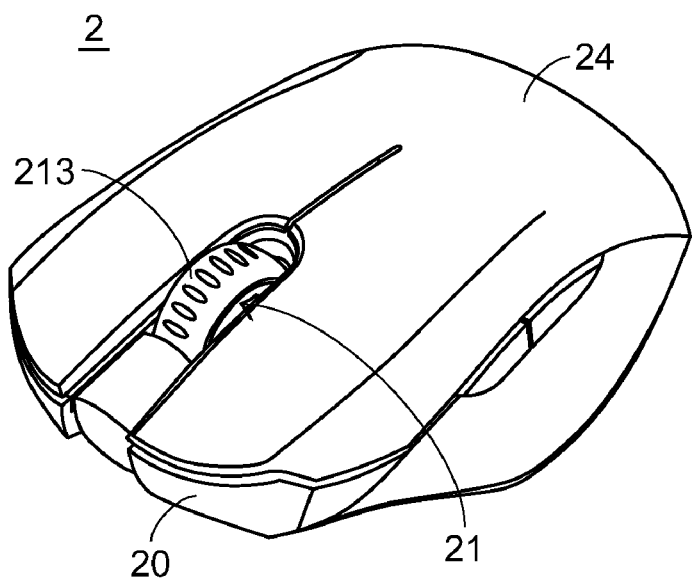
FIG. 2 is a schematic outward view of a wheel mouse according to a preferred embodiment of the present invention.

The present invention relates to a wheel mouse having a reduced volume and a reduced loading on the rotating shaft. FIG. 2 is a schematic outward view of a wheel mouse according to a preferred embodiment of the present invention. The wheel mouse 2 principally comprises a mouse case 24, a base 20 and a wheel 21. The base 20 is covered by the mouse case 24. The wheel 21 is disposed on the base 20. A portion of the wheel 21 is protruded out of the mouse case 24 such that the wheel 21 can be rotated by a user's finger.

Figure 3:
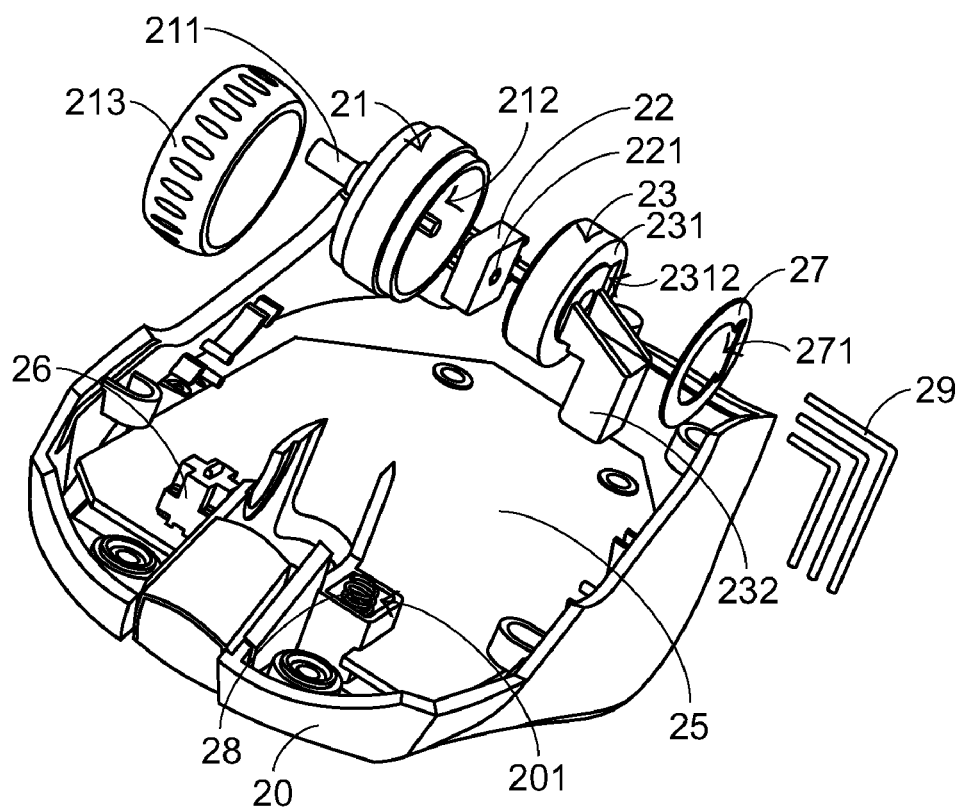
FIG. 3 is a schematic exploded view illustrating the internal portion of the wheel mouse according to the preferred embodiment of the present invention.

FIG. 3 is a schematic exploded view illustrating the internal portion of the wheel mouse according to the preferred embodiment of the present invention. The wheel mouse 2 principally comprises the base 20, a circuit board 25, the wheel 21, an outer frame 213, an encoder 22, a fixing element 23, a switch element 26, a spring 28, a wheel cover 27 and conductive wires 29. A receiving recess 201 is formed on the base 20. The fixing element 23 comprises a ring-shaped part 231 and a hollow post 232. The ring-shaped part 231 of the fixing element 23 is used for accommodating the encoder 22. The wheel 21 has a rotating shaft 211 and a receptacle 212. It is preferred that the rotating shaft 211 is integrally formed with the wheel 21. The encoder 22 has an encoder perforation 221.

Figure 4A:
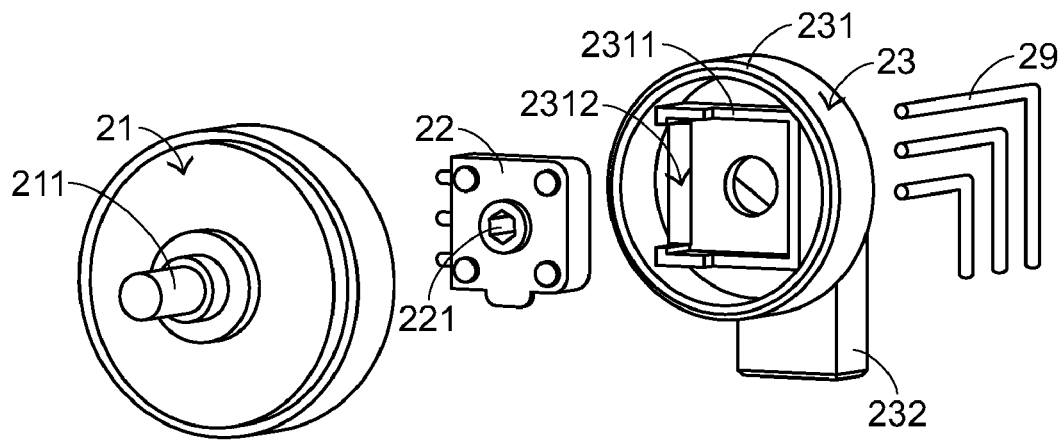
FIGS. 4A and 4B are schematic exploded views illustrating the relative locations of the wheel, the encoder, the fixing element and the conductive wires of the wheel mouse.
Figure 4B:
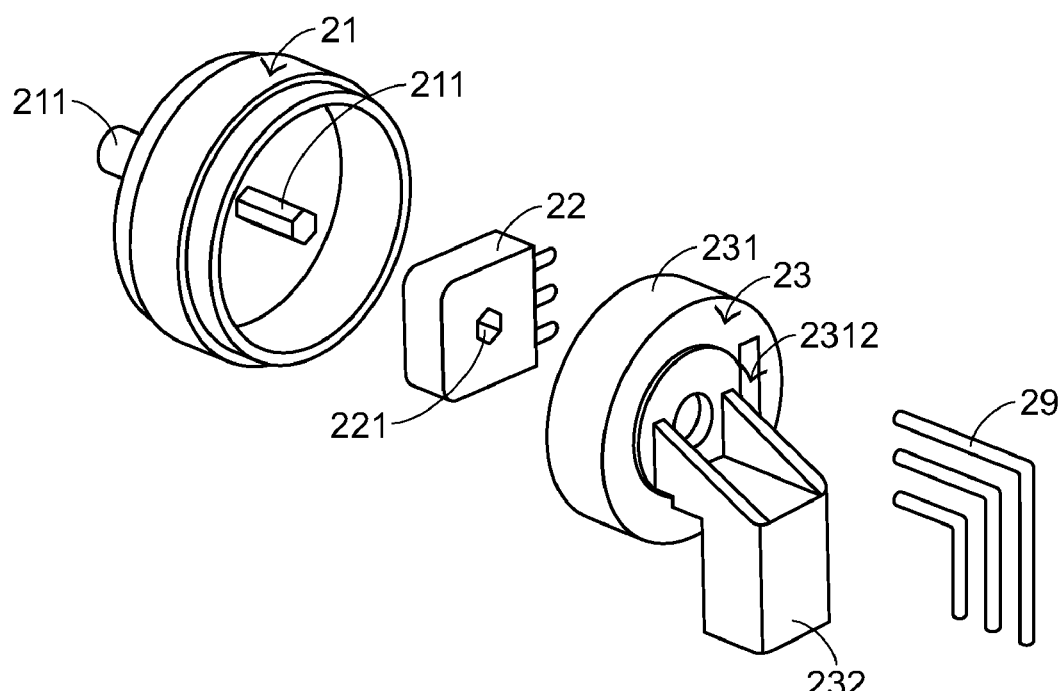

In accordance with a key feature of the present invention, the encoder 22 is accommodated within the wheel 21 and the space occupied the encoder 22 is saved, so that the volume of the mouse case 24 is reduced. Hereinafter, the arrangement of the encoder 22 will be illustrated with reference to FIGS. 4A and 4B. FIGS. 4A and 4B are schematic exploded views illustrating the relative locations of the wheel, the encoder, the fixing element and the conductive wires of the wheel mouse. As shown in FIGS. 4A and 4B, the ring-shaped part 231 of the fixing element 23 comprises an inner frame 2311 and an opening 2312. The encoder 22 is fixed on the inner frame 2311 of the ring-shaped part 231. A first end of the rotating shaft 211 is penetrated through the encoder perforation 221 and the ring-shaped part 231 of the fixing element 23 is received in the receptacle 212 of the wheel 21. In addition, the conductive wires 29 are penetrated through the opening 2312 of the ring-shaped part 231 and then connected with the encoder 22.

Figure 5:
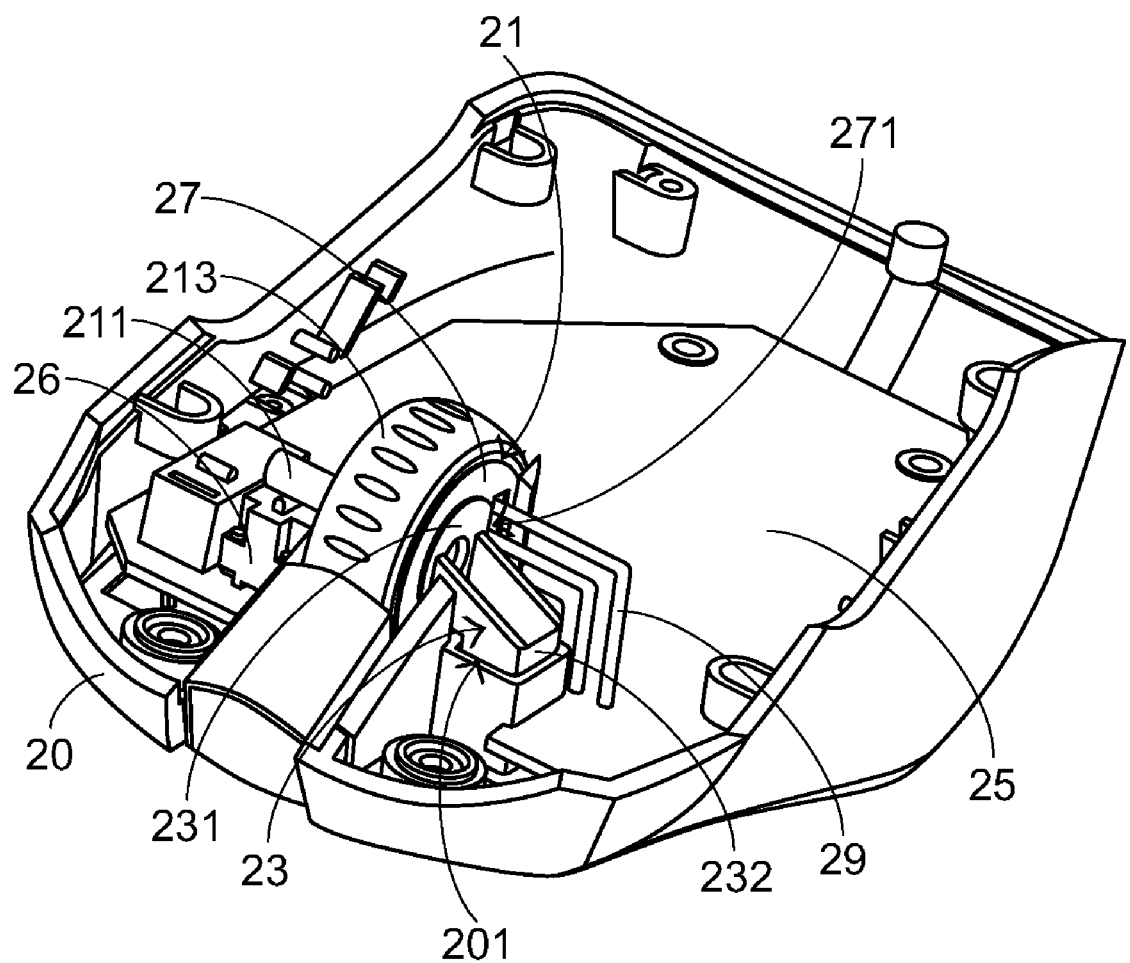
FIG. 5 is a schematic assembled view illustrating the internal portion of the wheel mouse according to the preferred embodiment of the present invention.

FIG. 5 is a schematic assembled view illustrating the internal portion of the wheel mouse according to the preferred embodiment of the present invention. The circuit board 25 is disposed on the base 20. The switch element 26 is mounted on the circuit board 25 and under a second end of the rotating shaft 211. The spring 28 is accommodated in the receiving recess 201. The outer frame 213 is disposed on the outer periphery of the wheel 21. By rotating the outer frame 213 with the user's finger, the wheel 21 is rotated accordingly. The wheel 21 is disposed on the base 21 and arranged between the receiving recess 201 and the switch element 26. The encoder 22 is accommodated in the ring-shaped part 231 of the fixing element 23. The ring-shaped part 231 of the fixing element 23 is received in the receptacle 212 of the wheel 21. The first end of the rotating shaft 211 is penetrated through the encoder perforation 221 and then fixed in the ring-shaped part 231 of the fixing element 23. The hollow post 232 is accommodated in the receiving recess 201 and sustained against the spring 28, so that the spring 28 offers an elastic force to the fixing element 23. The ring-shaped part 231 of the fixing element 23 is sheltered by the wheel cover 27 such that the receptacle 212 of the wheel 21 is unexposed. In addition, the wheel cover 27 has a cover aperture 271 aligned with the opening 2312 of the ring-shaped part 231. The conductive wires 29 are penetrated through the opening 2312 and the cover aperture 271 such that both terminals of the conductive wires 29 are connected to the encoder 22 and the circuit board 25, respectively.

The operations of the wheel mouse 2 will be illustrated in more details as follows. The processes of clicking the left click button and the right click button are known in the art, and are not redundantly described herein. By rotating the outer frame 213 with the user's finger, the wheel 21 is rotated accordingly. Upon the rotation of the wheel 21, the rotating shaft 211 is also rotated because the rotating shaft 211 is integrally formed with the wheel 21. When the rotating shaft 211 is rotated in the encoder perforation 221, the encoder 22 generates a corresponding electronic signal. The electronic signal is transmitted to the circuit board 25 through the conductive wires 29.

For executing the wheel button function, a depressing force is exerted on the outer frame 213 to press down the outer frame 213. Due to the depressing force, the wheel 21 is moved downwardly. As the wheel 21 is moved downwardly, the rotating shaft 211 is also moved downwardly. Until the second end of the rotating shaft 211 is contacted with the switch element 26 of the rotating shaft 211, the switch element 26 is triggered to generate a wheel button signal to the circuit board 25. In response to the wheel button signal, the wheel mouse 2 executes the wheel button function. Moreover, as the wheel 21 is moved downwardly, the fixing element 23 that is connected to the wheel 21 is also moved downwardly. Since the spring 28 is sustained between the hollow post 232 and the receiving recess 201, the spring 28 is compressed when the hollow post 232 of the fixing element 23 is moved downwardly. When the depressing force is eliminated, the compressed spring 28 is returned to its uncompressed state and the hollow post 232 of the fixing element 23 is exerted by the restoring force of the spring 28. Due to the restoring force of the spring 28, the fixing element 23 is moved upwardly and the wheel 21 is also moved upwardly. As such, the fixing element 23 and the wheel are returned to their original positions.

From the above description, since the encoder is accommodated within the wheel, the space within the mouse case is reduced and thus the overall volume of the wheel mouse is reduced. Since the first end of the rotating wheel is supported by the fixing element and the spring and movable with the fixing element, the depressing force exerted on the rotating wheel is buffered by the spring when the wheel is pressed down. In other words, since the loadings on the wheel and the rotating shaft are largely reduced, the use lives of the wheel and the rotating shaft will be extended. In addition, the touch feel of depressing the wheel 21 will become humanized and more natural. Therefore, the wheel mouse of the present invention is slim and has a reduced loading obviate the drawbacks encountered from the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wheel mouse comprising:
a mouse case;
a base;
a circuit board disposed on said base;
an encoder having an encoder perforation;
a fixing element comprising a ring-shaped part and a hollow post, wherein said encoder is accommodated within said ring-shaped part;
a wheel comprising a rotating shaft and a receptacle, wherein said ring-shaped part of said fixing element is accommodated in said receptacle and a first end of said rotating shaft is inserted into said encoder perforation;
a switch element mounted on said circuit board and under a second end of said rotating shaft; and
a spring disposed on said base and inserted into said hollow post for offering an elastic force on said fixing element.

2. The wheel mouse according to claim 1 wherein said wheel mouse further comprises an outer frame disposed on the outer periphery of said wheel.

3. The wheel mouse according to claim 1 wherein said wheel mouse further comprises a conductive wire, which is connected to said encoder.

4. The wheel mouse according to claim 3 wherein said ring-shaped part of said fixing element further comprises an inner frame for fixing said encoder.

5. The wheel mouse according to claim 3 wherein said ring-shaped part of said fixing element further comprises an opening, and said conductive wire is penetrated through said opening to be connected with said encoder.

6. The wheel mouse according to claim 5 wherein said wheel mouse further comprises a wheel cover for sheltering said ring-shaped part of said fixing element such that said receptacle of said wheel is unexposed.

7. The wheel mouse according to claim 6 wherein said wheel cover further comprises a cover aperture aligned with said opening such that said conductive wire is penetrated through said opening and said cover aperture to be connected to said circuit board.

8. The wheel mouse according to claim 1 wherein said rotating shaft is integrally formed with said wheel.

9. The wheel mouse according to claim 1 wherein said wheel mouse further comprises a receiving recess formed on said base for accommodating said hollow post and said spring, wherein said spring is sustained against said hollow post and said receiving recess.

* * * * *